United States Patent
Biller

(10) Patent No.: US 6,921,041 B2
(45) Date of Patent: Jul. 26, 2005

(54) SEAT-BELT RETRACTOR

(75) Inventor: Dieter Biller, Alfdorf-Brech (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/431,855

(22) Filed: May 8, 2003

(65) Prior Publication Data

US 2003/0209624 A1 Nov. 13, 2003

(30) Foreign Application Priority Data

May 13, 2002 (DE) ...................................... 202 07 729 U
Aug. 6, 2002 (DE) ...................................... 202 12 088 U

(51) Int. Cl.[7] ............................................. B65H 75/48
(52) U.S. Cl. ................................... 242/390.8; 280/807
(58) Field of Search .......................... 242/390.8, 390.9; 280/807

(56) References Cited

U.S. PATENT DOCUMENTS 6,641,077 B2 * 11/2003 Hanna et al. ............ 242/382.2

FOREIGN PATENT DOCUMENTS

| DE | 2559378 A1 | 7/1976 |
| DE | 2630249 A1 | 1/1978 |
| DE | 10012851 A1 | 9/2000 |
| DE | 19780583 C1 | 1/2001 |
| DE | 19960554 A1 | 3/2001 |
| DE | 10020245 A1 | 11/2001 |

* cited by examiner

Primary Examiner—John Q. Nguyen
(74) Attorney, Agent, or Firm—Tarolli, Sundheim, Covell & Tummino L.L.P.

(57) ABSTRACT

A seat-belt retractor is provided wherein no further belt retraction is necessary to unlock the belt spool following a tensioning of the belt webbing. Specifically, the seat-belt retractor has a belt spool that is rotatably mounted in a frame and a coupling pawl that is pivotally mounted on one face of the belt spool. The drive wheel is mounted in the frame co-axially with the belt spool. The drive wheel has an annular internal toothing extending around the coupling pawl. The coupling pawl has a free end shaped with a coupling tooth or a pair of coupling teeth and is movable, in a tension-released condition of belt webbing, from an engagement position where the coupling tooth or teeth is or are engaged in a tooth gap or two adjacent tooth gaps of the internal toothing, to a release position disengaged from the internal toothing. The electric motor has an output shaft connected to the drive wheel through a self-locking gear transmission that inhibits rotation of the drive wheel other than through rotation of the output shaft of the electric motor. By virtue of the self-locking feature of the gear transmission, the coupling pawl with the annular internal toothing of the drive wheel constitute, in fact, in addition to the selective coupling function, an automatic locking mechanism for the belt spool. To enable the coupling pawl to be returned to the release position without further retraction of belt webbing and after a belt tensioning operation, an appropriate geometry of the toothings involved is selected.

20 Claims, 1 Drawing Sheet

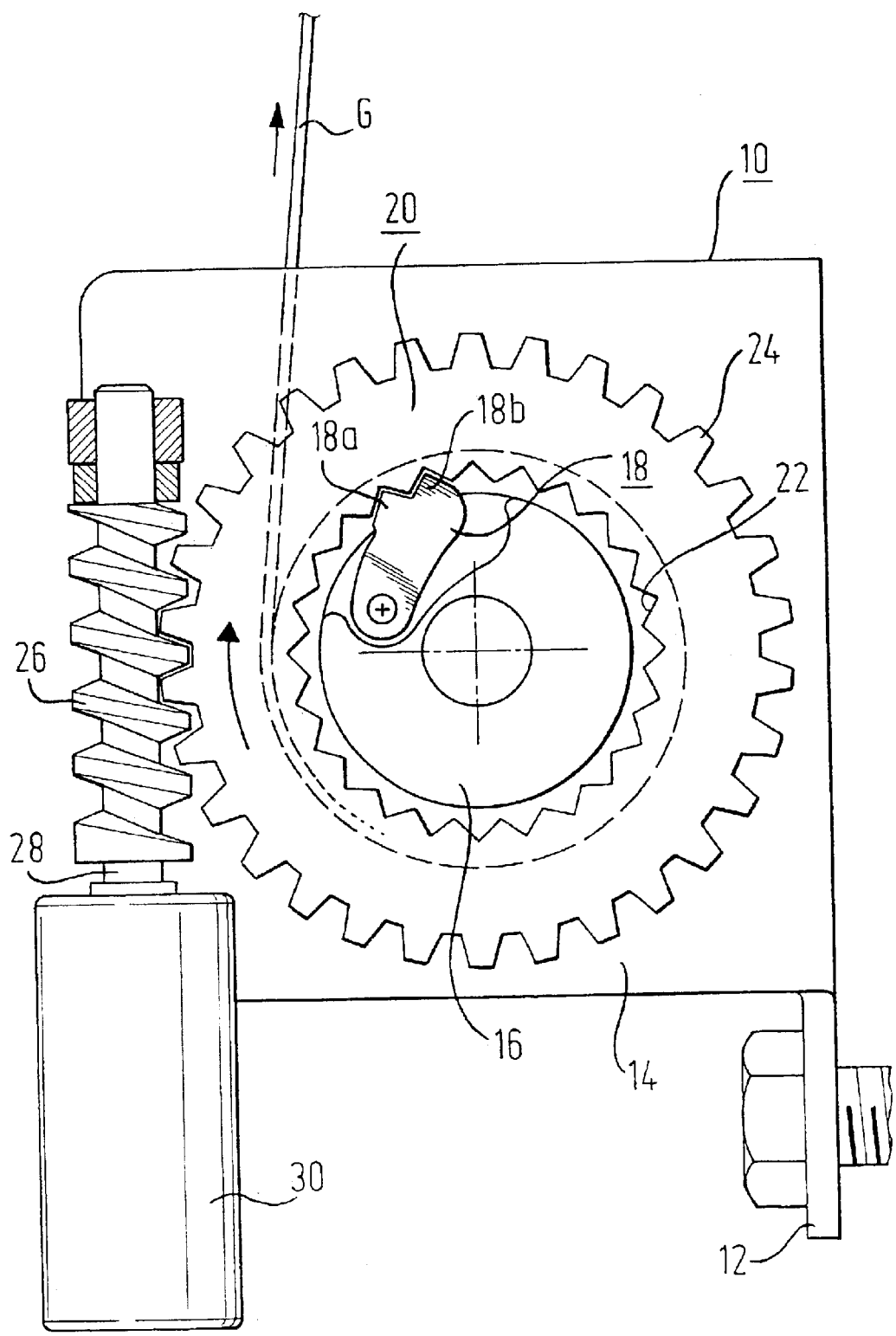

SEAT-BELT RETRACTOR

FIELD OF THE INVENTION

The present invention relates to a seat-belt retractor with a belt spool that is rotatably mounted in a frame and that, in case of an emergency, is positively driven by an electric motor to tension the seat belt webbing.

BACKGROUND OF THE INVENTION

In a sophisticated seat-belt retractor that has a reversible drive with an electric motor for the winding and unwinding function as well as for the belt tensioning in case of a possible emergency, the belt spool is blocked by a mechanical locking system after the belt webbing has been tensioned. The locking system generally comprises a coupling pawl pivotally mounted in the retractor frame and a cooperating locking toothing on the periphery of the belt spool. The toothing geometry is designed so that, after an initial contact between the coupling pawl and the teeth of the locking toothing, the coupling pawl is positively pulled into full engagement in a gap of the locking toothing. In other words, the locking toothing geometry is provided with an undercut. Since the tensioning of the belt webbing is but a measure of precaution, normal operation of the seat-belt retractor must be restored after a locking has occurred. With such a toothing geometry, however, it is impossible to disengage the coupling pawl from the locking toothing without a prior reverse rotation of the belt spool. Such reverse rotation of the, belt spool can be effected by activating the electric motor in a sense to retract some belt webbing. However, as the belt webbing is already tensioned in such a situation, high demands on the power of the electric motor are made. Moreover, a vehicle occupant would feel an additional belt retraction, with a consequential additional tension, to be unpleasant.

SUMMARY OF THE INVENTION

The present invention provides a seat-belt retractor wherein no additional belt retraction is necessary to unlock the belt spool following a tensioning of the belt webbing. Specifically, the seat-belt retractor according to the invention has a belt spool that is rotatably mounted in a frame and a coupling pawl that is pivotally mounted on one face of the belt spool. The drive wheel is mounted in the frame co-axially with the belt spool. The drive wheel has an annular internal toothing extending around the coupling pawl. The coupling pawl has a free end shaped with a coupling tooth or a pair of coupling teeth and is movable, in a tension-released condition of belt webbing, from an engagement position where the coupling tooth or teeth is or are engaged in a tooth gap or two adjacent tooth gaps of the internal toothing, to a release position disengaged from the internal toothing. The electric motor has an output shaft connected to the drive wheel through a self-locking gear transmission that inhibits rotation of the drive wheel other than through rotation of the output shaft of the electric motor. By virtue of the self-locking feature of the gear transmission, the coupling pawl with the annular internal toothing of the drive wheel constitute, in fact, in addition to the selective coupling function, an automatic locking mechanism for the belt spool. To enable the coupling pawl to be returned to the release position without further retraction of belt webbing and after a belt tensioning operation, an appropriate geometry of the toothings involved is selected. In particular, the toothing geometry must not have an undercut, i.e. the pawl tooth or teeth should not strike against any surface of the co-operating annular toothing in the course of its or their movement to the disengaged condition. Then, a minor rotation of the belt spool in an unwinding direction will sufficiently reduce belt tension to permit a disengagement movement of the coupling pawl from the drive wheel.

Additional features and advantages of the invention ensue from the following description of an advantageous embodiment and from the accompanying drawing whose single FIGURE schematically shows the belt retractor in a side view.

DESCRIPTION OF PREFERRED EMBODIMENT

The seat-belt retractor has a frame 10 consisting of a base-plate 12 and two legs 14 that are bent down from the base-plate at a right angle. Between the legs 14, a belt spool 16 is rotatably mounted about an axis of rotation. A coupling pawl 18 is pivotally mounted about a pivotal axis on one face of the belt spool 16. The coupling pawl 18 is surrounded by a ring-shaped drive wheel 20 that is co-axial with belt spool 16 and has an internal gear toothing 22 to interact with the coupling pawl 18. On the outer circumference of the coupling wheel 20, there are worm gear teeth 24 that mesh with a drive screw 26. The drive screw 26 is rotatably mounted in frame 10 and is provided on an output shaft 28 of an electric motor 30.

The coupling pawl 18 has two coupling teeth 18a, 18b at its free end. The geometry of the coupling teeth 18a, 18b is adapted to that of the coupling toothing 22 and has symmetrical tooth flanks with respect to a radial line through the axis of rotation of belt spool 16 and a respective tooth tip. Likewise, the teeth of toothing 22 have symmetrical flanges with respect to radial lines extending through the axis of rotation of belt spool 16 and respective tooth tips. The teeth are thus without an undercut so that disengagement of pawl 18 from toothing 22 is possible without relative rotation between belt spool 16 and drive wheel 20.

The single FIGURE shows the seat-belt retractor with the coupling pawl 18 in an activated condition and thus coupling teeth 18a, 18b of pawl 18 engage opposite tooth gaps of the coupling toothing 22. In this condition, when the drive screw 26 is at rest, belt spool 16 is blocked from rotation since the drive connection between the drive screw 26 and the drive wheel 20 is self-locking, i.e. rotation can only be effected by operation of electric motor 30. The coupling pawl 18 is actuated in a conventional manner by a mechanical sensor or by an electromagnet.

In the preferred embodiment as shown, the pivotal axis of coupling pawl 18 is selected in relation to the angular position of coupling tooth 18b in its engaged condition so that a radial line passing through the pivotal axis of coupling pawl 18 and through the axis of rotation of belt spool 16 defines an angle in a range between 10° and 30° with a radial line passing through the axis of rotation of belt spool 16 and the tip of coupling tooth 18a. As a result of such geometry, coupling pawl 18 tends to be forcibly engaged in the internal toothing 22 of drive wheel 20 when the belt webbing G is tensioned, is easily disengaged from the internal toothing 22 of drive wheel 20 when the belt webbing G is tension-released, and is even positively disengaged from the internal toothing 22 of drive wheel 20 when the latter is rotated relative to belt spool 16 in an unwinding direction.

In case of a possible emergency, as detected by appropriate sensors well known in the art, the coupling pawl 18 is pivoted to its engagement position shown in the FIGURE, and the electric motor 30 is activated to rotate belt spool 16 forcibly in a winding direction. After such a belt tensioning operation, belt webbing G is under a high tension, as indicated by an arrow. The coupling pawl 18 engaged into the coupling toothing 22 of the drive wheel 20 is under a load of a corresponding magnitude. In order to disengage the coupling pawl 18 from the coupling toothing 22, the drive screw 26 is now made to rotate by the electric motor 30 in order to rotate the drive wheel 20 and thus the belt spool 16 clockwise, as is indicated by an arrow in the FIGURE. Due to the rotation of the belt spool 16, some belt webbing G is unwound from the belt spool 16 until the belt webbing is virtually unstressed. In this condition, the coupling pawl 18 can become disengaged from the coupling teeth 22 under the action of a return spring and can be pivoted back into its disengaged position. The seat-belt retractor then has its normal winding and unwinding functions.

What is claimed is:

1. A seat-belt retractor for vehicles, comprising a frame, a belt spool rotatably mounted in said frame about an axis of rotation, a belt webbing wound onto said belt spool, a drive wheel rotatably mounted in said frame co-axially with said belt spool, and a coupling pawl pivotally mounted on a side face of said belt spool about a pivotal axis, said drive wheel having an annular internal toothing extending around said coupling pawl, said coupling pawl having a free end shaped with at least one coupling tooth and being movable, in a substantially tension-reduced condition of the belt webbing, from an engagement position where the coupling tooth is engaged in a tooth gap of said internal toothing to a release position disengaged from said internal toothing, and an electric motor having an output shaft connected to said drive wheel through a self-locking gear transmission that inhibits rotation of said drive wheel other than through rotation of said output shaft.

2. The seat-belt retractor according to claim 1, wherein said internal toothing and said coupling tooth have a complementary geometry such that movement of said coupling pawl from the engagement position towards the release position is possible without relative rotation between said belt spool and said drive wheel.

3. The seat-belt retractor according to claim 2, wherein said coupling tooth has a tooth tip and tooth flanges extending from said tooth tip on both sides of a first radial line extending through said tooth tip and said axis of rotation.

4. The seat-belt retractor according to claim 3, wherein a second radial line extending through the axis of rotation and through the pivotal axis defines an angle in a range between 10° and 30° with the first radial line.

5. The seat-belt retractor according to claim 3, wherein said tooth flanges extend substantially symmetrically on both sides of the first radial line.

6. The seat-belt retractor according to claim 1, wherein said output shaft is provided with a drive screw and the drive wheel has an outer worm wheel toothing in meshing engagement with said drive screw.

7. The seat-belt retractor according to claim 1, wherein said coupling pawl has a pair of adjacent coupling teeth.

8. The seat-belt retractor according to claim 1, wherein said substantially tension-reduced condition of the belt webbing is achieved by a limited rotation of the belt spool in an unwinding direction.

9. The seat-belt retractor according to claim 8, wherein the limited rotation of the belt spool to achieve said substantially tension-reduced condition of the belt webbing is caused by rotation of said drive wheel by said electric motor.

10. The seat-belt retractor according to claim 1 wherein the pivotal axis of said coupling pawl does not displace with respect to the axis of rotation of said belt spool upon said coupling pawl moving from the engagement position to the release position.

11. A seat-belt retractor for vehicles, comprising a frame, a belt spool rotatably mounted in said frame about an axis of rotation, a belt webbing wound onto said belt spool, a drive wheel rotatably mounted in said frame co-axially with said belt spool, and a coupling pawl pivotally mounted on a side face of said belt spool about a pivotal axis, said drive wheel having an annular internal toothing extending around said coupling pawl, said coupling pawl having a free end shaped with at least one coupling tooth and being movable from an engagement position where the coupling tooth is engaged in a tooth gap of said internal toothing with said coupling pawl being under a load of a predetermined magnitude corresponding to the tension of the belt webbing to a release position disengaged from said internal toothing, wherein a reduction of tension in the belt webbing substantially below said predetermined magnitude allows said coupling pawl to disengage from said internal toothing, an electric motor having an output shaft connected to said drive wheel through a self-locking gear transmission that inhibits rotation of said drive wheel other than through rotation of said output shaft.

12. The seat-belt retractor according to claim 11 wherein the pivotal axis of said coupling pawl does not displace with respect to the axis of rotation of said belt spool upon said coupling pawl moving from the engagement position to the release position.

13. The seat-belt retractor according to claim 11, wherein said internal toothing and said coupling tooth have a complementary geometry such that movement of said coupling pawl from the engagement position towards the release position is possible without relative rotation between said belt spool and said drive wheel.

14. The seat-belt retractor according to claim 13, wherein said coupling tooth has a tooth tip and tooth flanges extending from said tooth tip on both sides of a first radial line extending through said tooth tip and said axis of rotation.

15. The seat-belt retractor according to claim 14, wherein a second radial line extending through the axis of rotation and through the pivotal axis defines an angle in a range between 10° and 30° with the first radial line.

16. The seat-belt retractor according to claim 14, wherein said tooth flanges extend substantially symmetrically on both sides of the first radial line.

17. The seat-belt retractor accordinq to claim 11, wherein said output shaft is provided with a drive screw and the drive wheel has an outer worm wheel toothing in meshing engagement with said drive screw.

18. The seat-belt retractor according to claim 11, wherein said coupling pawi has a pair of adjacent coupling teeth.

19. The seat-belt retractor according to claim 11, wherein the reduction of tension in the belt webbing to be substantially below said predetermined magnitude is achieved by a limited rotation of the belt Spool in an unwinding direction.

20. The seat-belt retractor according to claim 19 wherein the limited rotation of the belt spool to achieve the reduction of tension in the belt webbing is caused by rotation of said drive wheel by said electric motor.

* * * * *

UNITED STATES PATENT AND TRADEMARK OFFICE
CERTIFICATE OF CORRECTION

PATENT NO. : 6,921,041 B2
DATED : July 26, 2005
INVENTOR(S) : Biller

It is certified that error appears in the above-identified patent and that said Letters Patent is hereby corrected as shown below:

Column 4,
Line 54, after "coupling" change "pawi" to -- pawl --.

Signed and Sealed this

Twentieth Day of December, 2005

JON W. DUDAS
*Director of the United States Patent and Trademark Office*